United States Patent [19]

Kortendick

[11] 3,982,572

[45] Sept. 28, 1976

[54] MANUAL LOG SPLITTER

[76] Inventor: Russell D. Kortendick, 4230 Woodview Lane, Racine, Wis. 53405

[22] Filed: Oct. 31, 1975

[21] Appl. No.: 627,758

[52] U.S. Cl. ........................ 144/193 D; 144/193 R; 144/193 B; 254/104

[51] Int. Cl.[2] ........................ A47J 49/02; B66F 1/00

[58] Field of Search ................ 144/2 R, 2 N, 193 R, 144/193 A, 193 B, 193 C, 193 D, 193 E, 193 F, 193 H, 193 J, 193 K, 309 R, 309 G; 254/104

[56] References Cited

UNITED STATES PATENTS

| | | | |
|---|---|---|---|
| 1,425,298 | 8/1922 | Treat | 144/193 B |
| 3,285,304 | 11/1966 | Fuller | 144/193 A |

*Primary Examiner*—Othell M. Simpson
*Assistant Examiner*—W. D. Bray
*Attorney, Agent, or Firm*—Axel H. Johnson

[57] ABSTRACT

A Manual Log Splitter comprising a frame having upright and laterally-spaced guide members, and a horizontal beam slidably-supported on the guide members. A splitting wedge is integral with the beam so as to be positioned in engagement with the upper end of the log. The wedge is then struck by a manually-held sledge to split the log; the operation is repeated, depending upon the size of the pieces desired.

2 Claims, 7 Drawing Figures

MANUAL LOG SPLITTER

This invention relates to manual means of splitting sections of logs for use in fire-places and similar uses.

The Prior Art includes a hydraulically-operated log splitter employing a power means to operate the wedge.

The log splitter of this invention comprises a base frame that can rest upon the ground or other solid surface. The log to be split is placed within the frame with the grain of the log directed vertically. Laterally-spaced vertical guides are positioned in the frame so as to be removable for storage or transportation. A transverse beam is slidably-mounted upon the guides, and has a splitting wedge centrally and integrally mounted thereon, and which wedge terminates upwardly in an anvil portion. When a log is to be split, the wedge is positioned with the edge thereof resting upon the upper end of the log and supported laterally by the guides. The handle of the sledge is then grasped by both hands and the anvil portion is struck by the sledge in the normal manner. As the splitting process continues, the wedge, being supported laterally, follows the split in the log until separation is completed.

Referring to the drawings.

Figure 2:
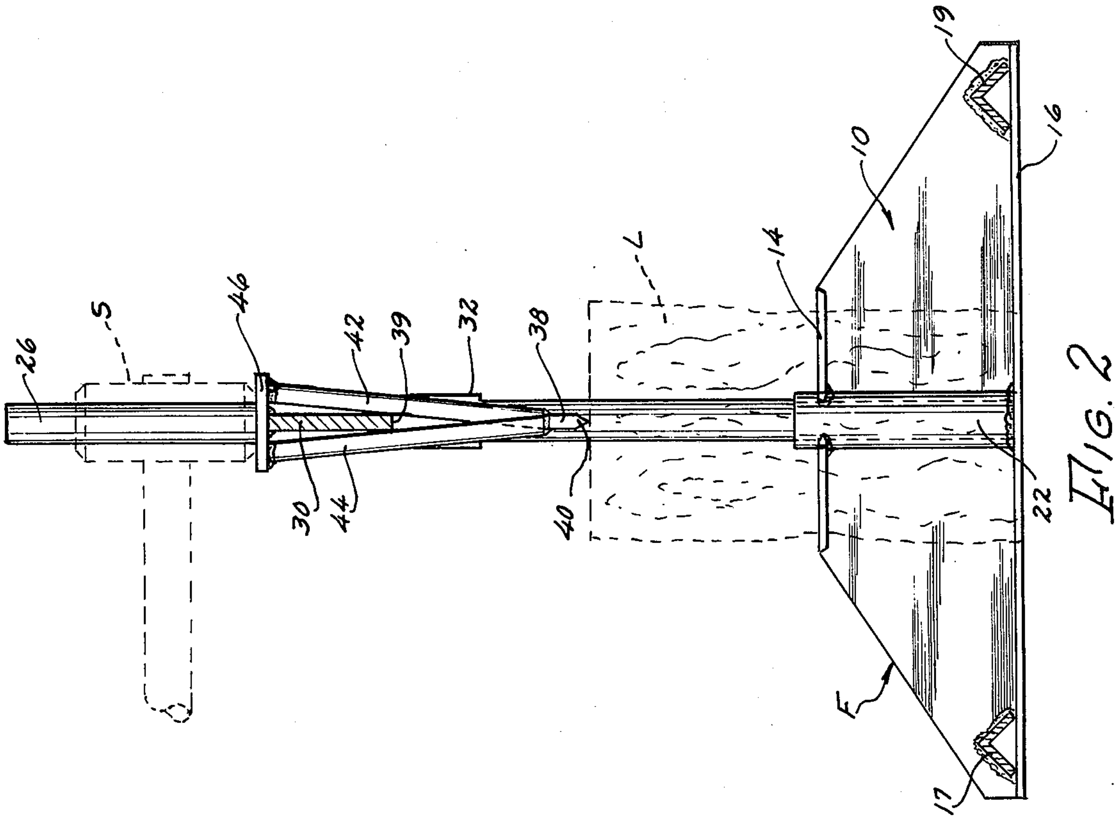
FIG. 2 is a side view of FIG. 1 taken at 2—2 thereof.
Figure 1:
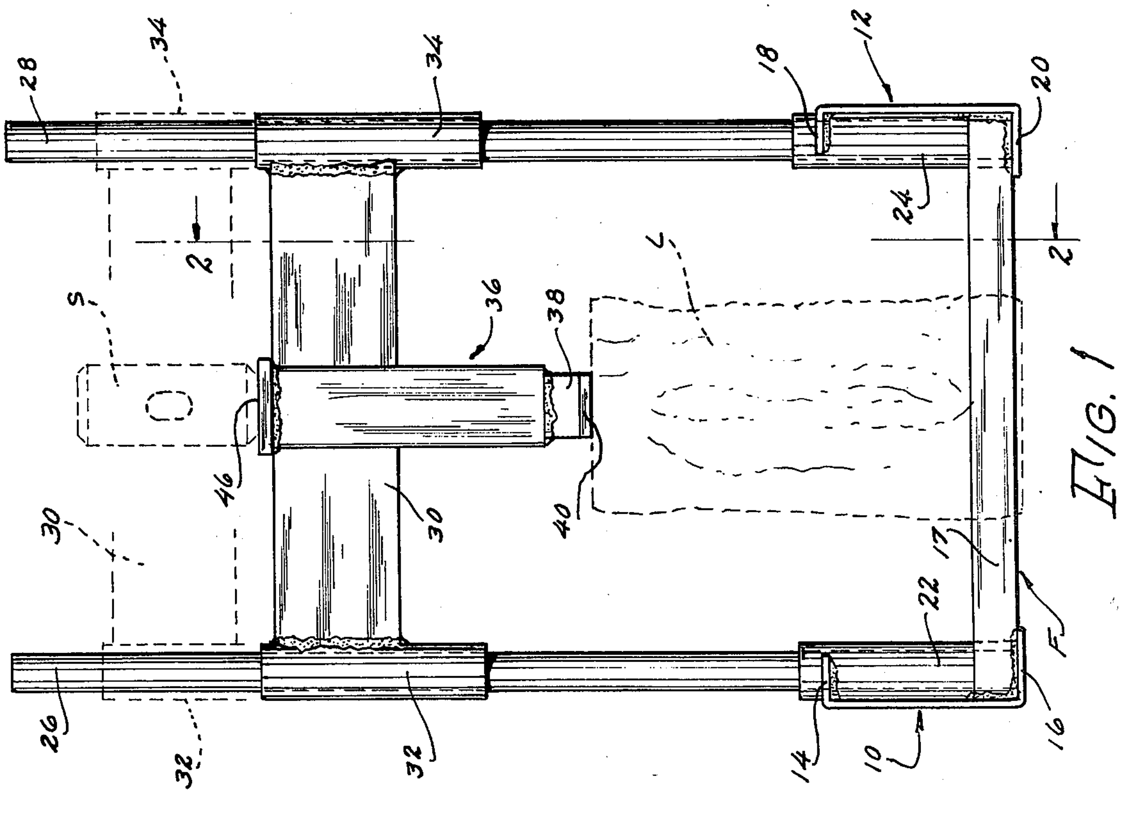
FIG. 1 is an upright view of the log splitter, with a log and sledge shown in dotted lines.
Figure 7:
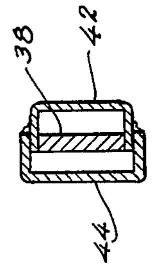
FIG. 7 is a section taken at 7—7 of FIG. 5.
Figure 5:
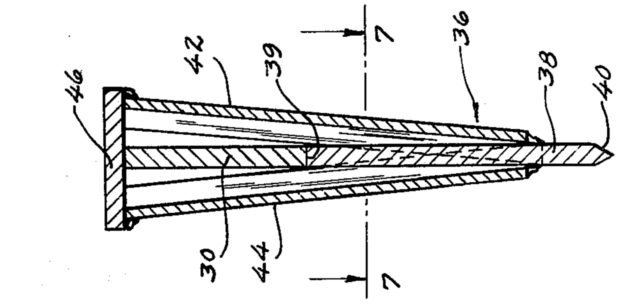
FIG. 5 is a section taken at 5—5 of FIG. 4.
Figure 6:
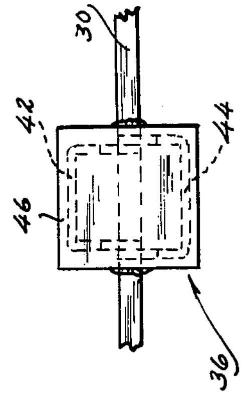
FIG. 6 is a plan view of the cap of the wedge.
Figure 4:
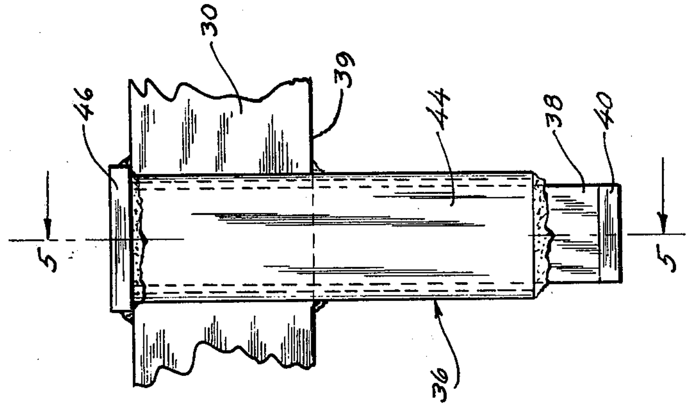
FIG. 4 is an enlarged view of the wedge of FIG. 1.
Figure 3:
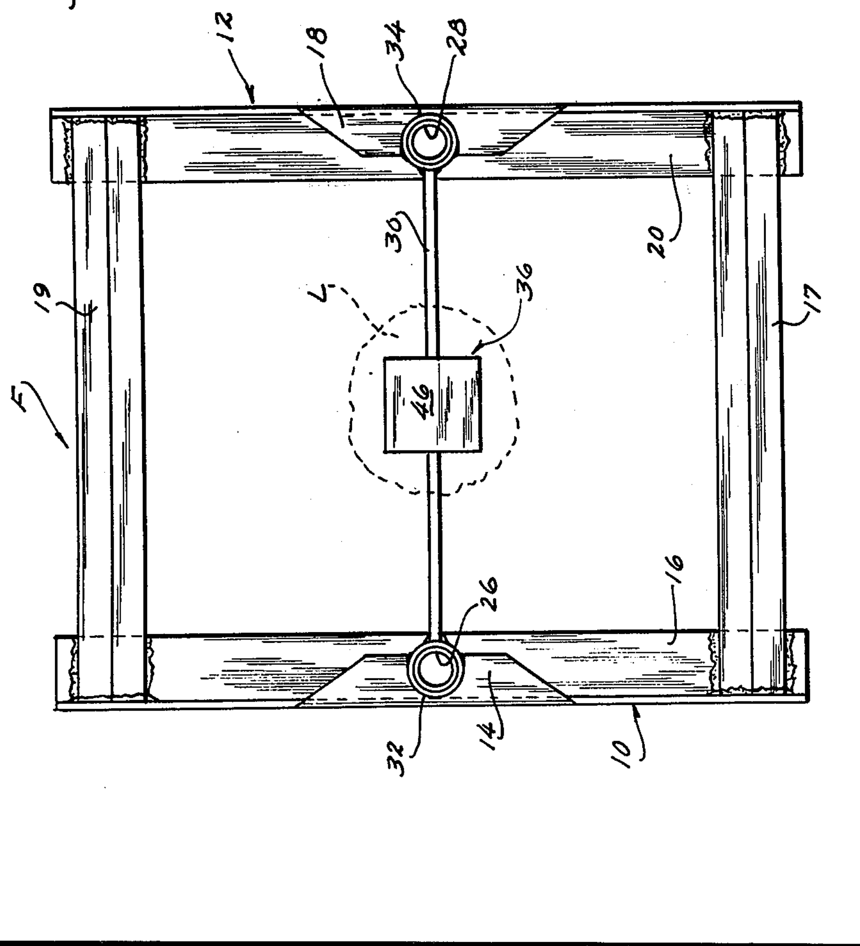
FIG. 3 is a plan view.

The frame F comprises plate members 10 and 12 having flanges 14, 16, 18 and 20. Tubular receptacles 22 and 24 are welded or otherwise suitably secured to plate members 10 and 12 and flanges 14, 16, 18 and 20. Angle members 17 and 19 are welded to members 10 and 12 to provide an integral frame. Guide members 26 and 28 are of tubing of a suitable length and are slidably inserted into receptacles 22 and 24.

Beam 30 extends between guide members 26 and 28. Tubular members 32 and 34 are slidable on guide members 26 and 28. Beam 30 is welded or otherwise secured integrally to members 32 and 34.

Wedge 36 comprises a blade 38 provided with a suitable cutting edge 40. Wedge walls 42 and 44 are channelled as shown and so mounted as to embrace blade 38 and beam 30. An anvil portion 46 rests upon the upper edge of beam 30 and is welded thereto. Wedge 36 is suitably welded to form an integral unit with beam 30, blade 38 and wedge-walls 42 and 44, with the upper end of blade 38 abutting the lower edge of beam 30 as shown at 39.

When using this log splitter, the frame F is placed upon a solid surface and the log L is positioned within the frame as shown in dotted lines. The beam assembly is then brought down with the blade 38 resting upon the log L. The cap 46 is then struck by use of the sledge S to split the log.

The above being a complete description of an illustrative embodiment of the invention, what is claimed as new and desired to be secured by Letters Patent of the United States is:

1. A means of splitting a log, said log positioned in a substantially upright position, said means comprising a frame surrounding said log, a substantially-upright guide means supported by said frame, a wedge-support beam freely slidable vertically on said guide means, a vertically-directed wedge integral with said support beam, said wedge terminating upwardly in an anvil portion, said wedge to be positioned in contact with said log, said log being split by striking said anvil portion with a sledge.

2. A means of splitting a log as set forth in claim 1, in which said wedge comprises upwardly-diverging opposed walls embracing said support beam, a blade extending downwardly from the lower edge of said beam and surrounded by said walls; said anvil portion, said walls, said support beam and said blade integrally welded or otherwise comprising an integral unit.

* * * * *